United States Patent [19]

Hatten et al.

[11] Patent Number: 5,067,440
[45] Date of Patent: Nov. 26, 1991

[54] SCRATCHING POSTS

[76] Inventors: Allen R. G. Hatten; Jean Hatten, both of 14 Lindisfarne Avenue, New Waltham, Grimsby, South Humberside, United Kingdom

[21] Appl. No.: 630,966

[22] Filed: Dec. 24, 1990

[30] Foreign Application Priority Data

Dec. 23, 1989 [GB] United Kingdom ................ 8929190
Jun. 21, 1990 [GB] United Kingdom ................ 9013823

[51] Int. Cl.$^5$ ............................................. A01K 29/00
[52] U.S. Cl. ..................................... 119/29; D30/160
[58] Field of Search ................ 119/29, 29.5, 156, 157; D30/158, 160

[56] References Cited

U.S. PATENT DOCUMENTS

| 3,306,264 | 2/1967 | Berens | 119/157 |
| 3,993,027 | 11/1976 | Mullin | 119/29 |
| 4,611,556 | 9/1986 | Frank | 119/29 |
| 4,790,265 | 12/1988 | Manson | 119/29 |

FOREIGN PATENT DOCUMENTS

| 0034868 | 9/1981 | European Pat. Off. | 119/29.5 |
| 3903473 | 8/1989 | Fed. Rep. of Germany | 119/29 |

OTHER PUBLICATIONS

*Animal Pet Care Products* catalog, p. 44, Sep. 9, 1989.
Sisal Cat Lounger, *Pedigrees* catalog, p. 18, Aug. 27, 1986.

Primary Examiner—Robert P. Swiatek
Assistant Examiner—Todd E. Manahan
Attorney, Agent, or Firm—Fleit, Jacobson, Cohn, Price, Holman & Stern

[57] ABSTRACT

A cat scratching post includes a cylindrical carrier (1) covered by a length of rope (3) which is helically close-wound between end cheeks (2a, 2b). A backing plate (4) for attachment to a wall has two support walls (6a and 6b) extending from its front face, and the walls have opposed recesses (9 and 10) to receive the end cheeks (2a), (2b). The upper wall (6a) receives a pin (12) secured to a knob (13), and the pin is received in a corresponding hole in the upper end cheek (2a). The pin (12) normally prevents the carrier (1) from rotating, but provision is also made for the carrier to be rotated to ensure even wear, and for the carrier to be removed for replacement.

7 Claims, 5 Drawing Sheets

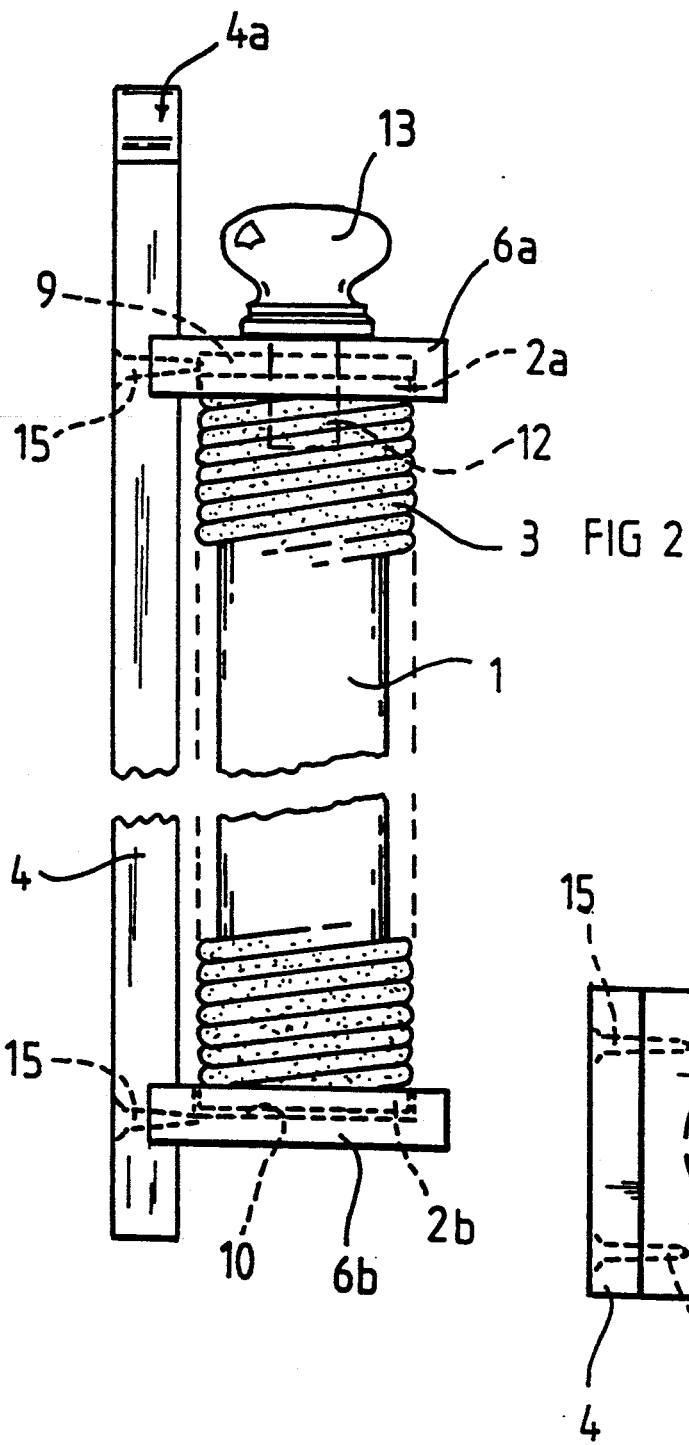

SCRATCHING POSTS

BACKGROUND OF THE INVENTION

1. Field of the Invention

This invention relates to scratching posts for cats and other animals.

2. Description of the Prior Art

Cats have a habit of standing on their hind legs and using their front paws to scratch any convenient object which their claws will dig into. This appears to help them to keep their claws in good condition and also enables them to exercise by stretching their body and leg muscles. This habit can be very annoying when the animal chooses to scratch against an item of furniture or a decorated part of the house.

U.S. Pat. No. 4,253,423 discloses a common form of scratching post in which an elongate carrier is wound with rope, and the carrier is upstanding from a base. The ends of the rope are pinned to the carrier so that the rope is not easily replaced. The main disadvantages of such a post are that the post takes up floor space, is easily overturned, and has a limited life.

European Patent Specification No. 0,201,932 discloses a scratching post which includes a wall-mounting backing plate and a pair of spaced support walls projecting from the backing plate. A series of cork elements are supported on a rod between the support walls, rather like a kebab. Although the cork elements can be removed from the rod for replacement they are not as effective as a length of rope wound on a carrier.

BRIEF SUMMARY OF THE INVENTION

An object of the present invention may be viewed as being to provide a form of scratching post which includes a length of rope or similar flexible element wound on a carrier, which does not take up floor space, and which is of longer life than existing rope scratching posts.

The present invention proposes that a carrier member, wound with a flexible element is removably mounted between support walls projecting from a backing plate, and the ends of the flexible element are releasably secured to cheek members mounted at each end of the carrier member.

Thus, by removing the carrier member from the support walls the length of rope can easily be replaced, thereby extending the life of the scratching post indefinitely.

In a particularly simple arrangement each cheek member preferably includes an inner wall and an outer wall which contains an aperture through which the end of the flexible element can be inserted to be retained in an annular recess formed between the said walls.

In order to obtain the maximum useable life from one length of flexible element the carrier member is preferably mounted for rotation about its length, and locking means are provided for securing the carrier member in a plurality of different rotational positions. The locking means may comprise a screw threaded pin which is inserted through one of the support walls into a co-operatively screw-threaded aperture in one of the cheek members, so that the carrier member can be drawn into engagement with the said support wall.

BRIEF DESCRIPTION OF THE DRAWINGS

The invention is exemplified in the accompanying drawings, wherein:

FIG. 2 is a front view of the scratching post of FIG. 1;

FIG. 3 is a plan view of the scratching post of FIG. 1;

DETAILED DESCRIPTION

Figure 1:
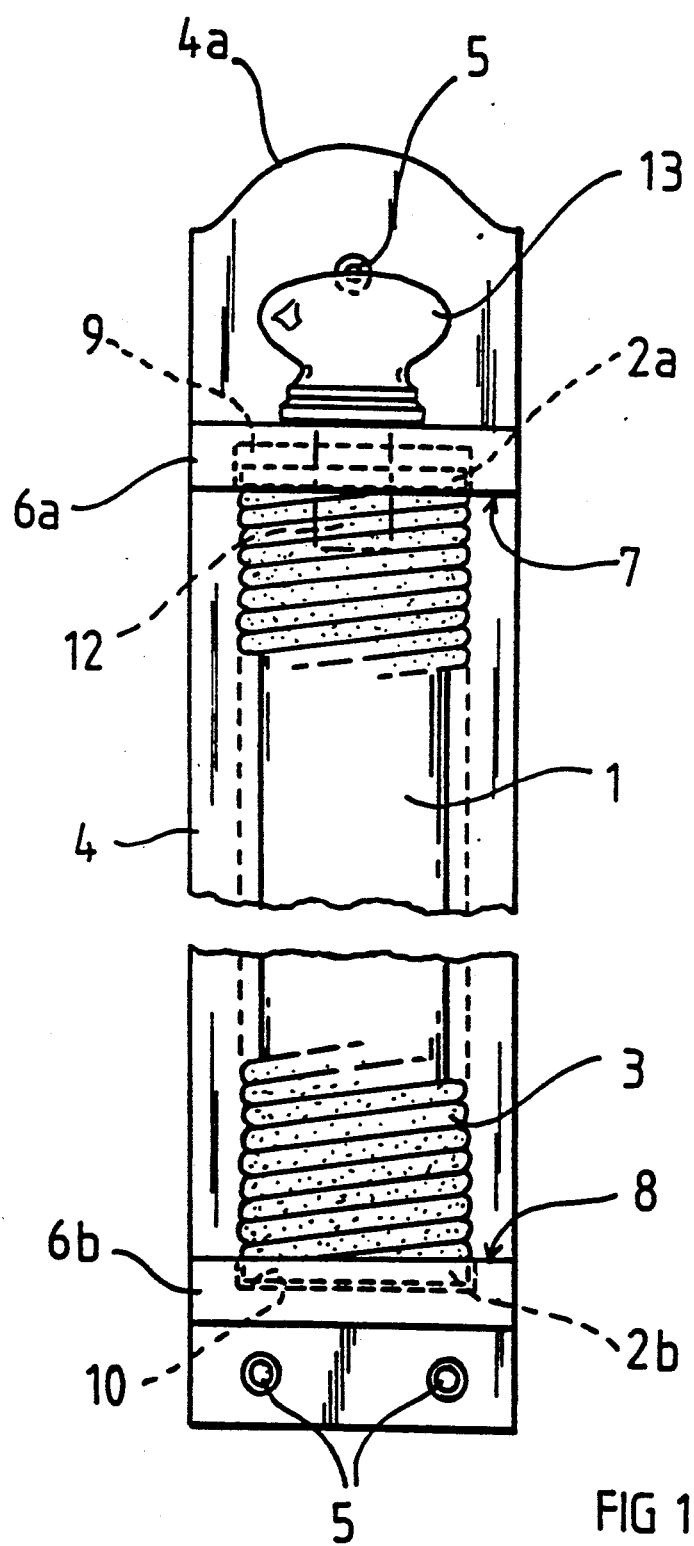
FIG. 1 is a side view of a scratching post in accordance with the invention.

In FIGS. 1 and 2 part of the length of the post has been omitted for purposes of illustration.

The scratching post comprises an elongate cylindrical carrier 1 which may for example be in the form of a hollow cardboard tube or a solid timber post. Each end of the carrier 1 is secured to a circular end cheek 2a, 2b, and the carrier is covered by a length of rope 3 which is helically close-wound between the end cheeks. The rope is formed from natural fibres such as those obtained from hemp or jute plants. A particularly suitable natural fibre is known as sisal. The diameter of the end cheeks 2a, 2b is substantially the same as that of the carrier plus the rope winding.

A flat elongate backing plate 4, containing screw holes 5 for attachment to a wall, has a profiled upper edge 4a. Two support walls 6a and 6b are secured by fixing screws 15 (FIGS. 2 and 3) or by other suitable means in two transversely extending slots in the front face of the backing plate, to project from the front of the backing plate in a parallel spaced relationship. The opposed inner faces 7 and 8 of the two support walls have a pair of opposed circular recesses 9 and 10 to receive the end cheeks 2a, 2b of the carrier 1. The recess 9 of the uppermost support wall 6a is deeper than that of the other wall 6b, and in addition, the upper wall 6a contains an axial through-hole 11 of square section (see FIG. 3) disposed centrally of the respective recess 9. A square section pin 12 secured to a knob 13 is received within this hole 11 and locates in a corresponding square-section hole in the corresponding upper end cheek 2a. The pin thus prevents the carrier 1 from rotating about its axis within the recesses 9 and 10. However, if the pin 12 is withdrawn from the holes the carrier can be rotated to any of three further positions which are mutually spaced by 90°, whereupon the pin can then be reinserted. The carrier can thus be rotated at intervals to ensure even wear. When the rope winding 3 becomes badly worn the pin can be removed and the carrier can in turn be lifted and removed from the recesses 9 and 10 for replacement.

The rope winding on the carrier provides a hard-wearing scratching post which is much loved by cats and which is not prone to shed material.

The backing plate 4 and the support walls 6a and 6b could have decorative corner mouldings applied to their edges for an enhanced visual appeal.

The carrier could be held captive in the recesses 9 and 10 and the carrier removed for replacement by unscrewing one of the end walls 6a or 6b. In this case the recesses 9 and 10 could be of the same depth.

Figure 4:
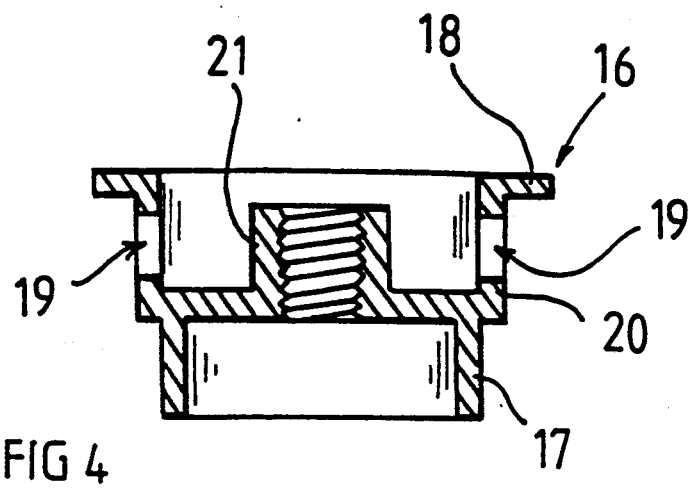
FIG. 4 is a longitudinal section through a modified end cheek for a scratching post in accordance with the invention.
Figure 5:
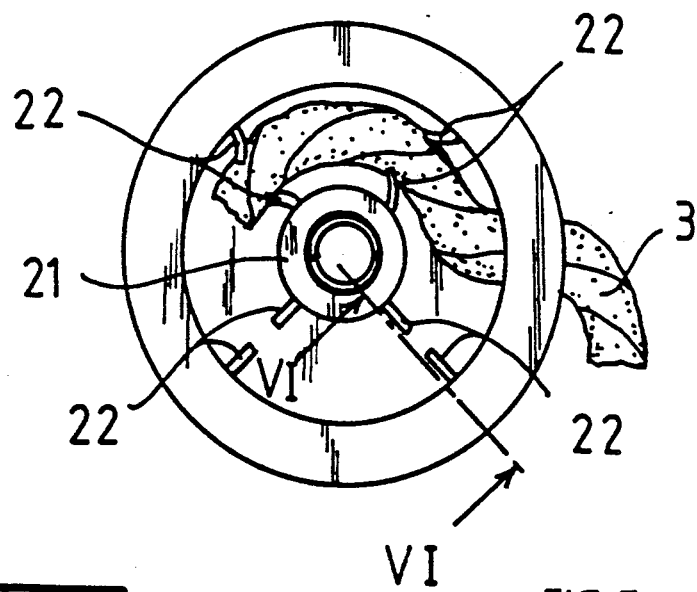
FIG. 5 is an end view of the modified end cheek of FIG. 4.
Figure 6:
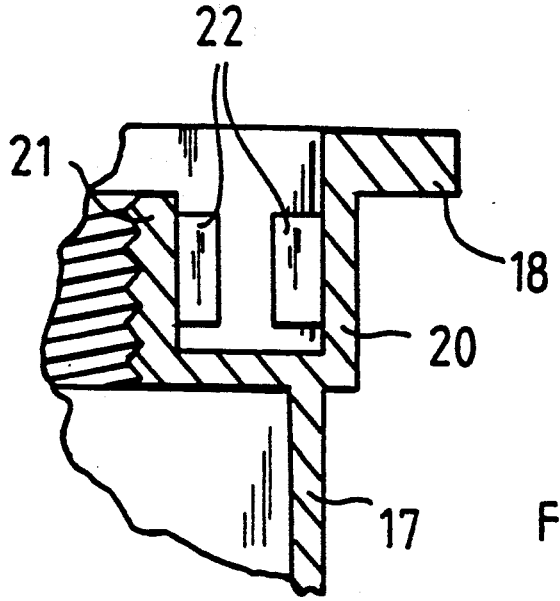
FIG. 6 is a detail on section VI—VI of FIG. 5.

The modified end cheek of FIGS. 4 to 6 is an injection moulded plastics component and includes a generally cup shaped part 16 with a cylindrical spigot 17 projecting from its bottom wall for insertion into the end of the tubular carrier 1. The opposite end of the cup shaped part 16 has an outwardly extending annular bearing flange 18, and has four circumferentially spaced holes 19 in its side wall 20. In addition, the cup shaped part 16 contains a central, internally threaded tubular boss 21. Between each adjacent pair of holes 19 the cup shaped part containing a pair of radially aligned flexible webs 22 (FIGS. 5 and 6) which project towards each other from the side wall 20 and the threaded boss 21.

A pair of such end cheek components are secured to opposite ends of the carrier 1. These components provide a simple means of terminating the ends of the rope 3, which are inserted through a convenient hole 19 and pressed between one or more pairs of webs 22 which resiliently grip the rope, as shown in FIG. 5.

Figure 7:
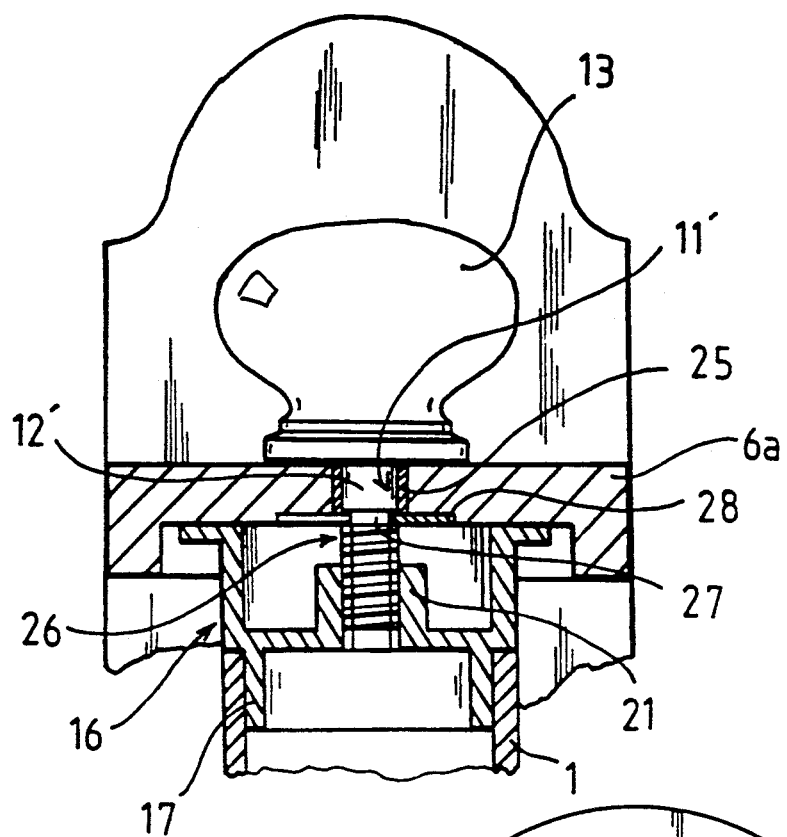
FIG. 7 is a longitudinal section through the upper part of a second embodiment of a scratching post in accordance with the invention, incorporating the modified end cheek of FIGS. 4, 5 and 6.
Figure 8:
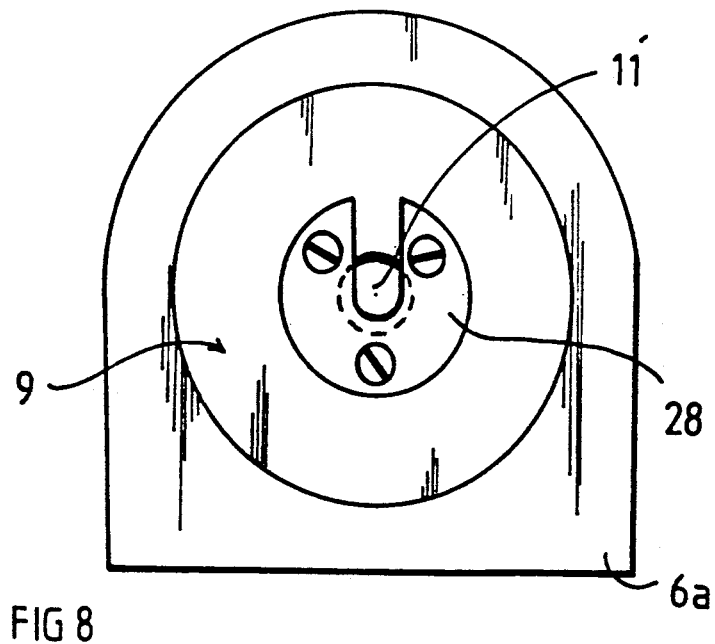
FIG. 8 shows the underside of the support wall of the scratching post of FIG. 7.

The lower end component may be mounted in an end wall 6b similar to that of FIGS. 1 to 3, but as shown in FIGS. 7 and 8, the upper end wall 6a has been modified by the provision of a circular aperture 11' in place of the square aperture 11. This circular aperture contains a tubular liner 25, and the pin 12' secured to knob 13 is now of circular section with an externally screw-threaded lower end 26. The pin 12' has a circumferential groove 27 which receives a slotted washer 28 (FIG. 8) secured to the end wall 6a. The knob 13 and pin 12' are thus held captive in the recess 11' by the washer 28. Alternatively, the pin 12' could be held captive by an E-clip pressed directly into the thread of end 26. The carrier is held in a certain rotational position by rotating the knob 13 to screw the pin 12 into the boss 21 and hence clamp the end cheek tightly against the end wall 6a. To rotate the carrier, the knob 13 is slackened, the carrier is rotated to its new position, and the knob re-tightened. In addition, by removing the lower end wall 6b the carrier can be unscrewed from the pin 12', inverted, and then refitted to permit equalisation of wear between the upper and lower ends of the rope.

Figure 9:
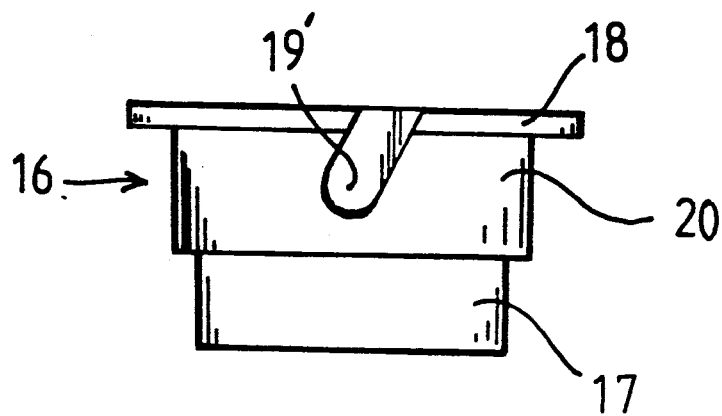
FIG. 9 is a side view of a further modified end cheek for a scratching post in accordance with the invention.
Figure 10:
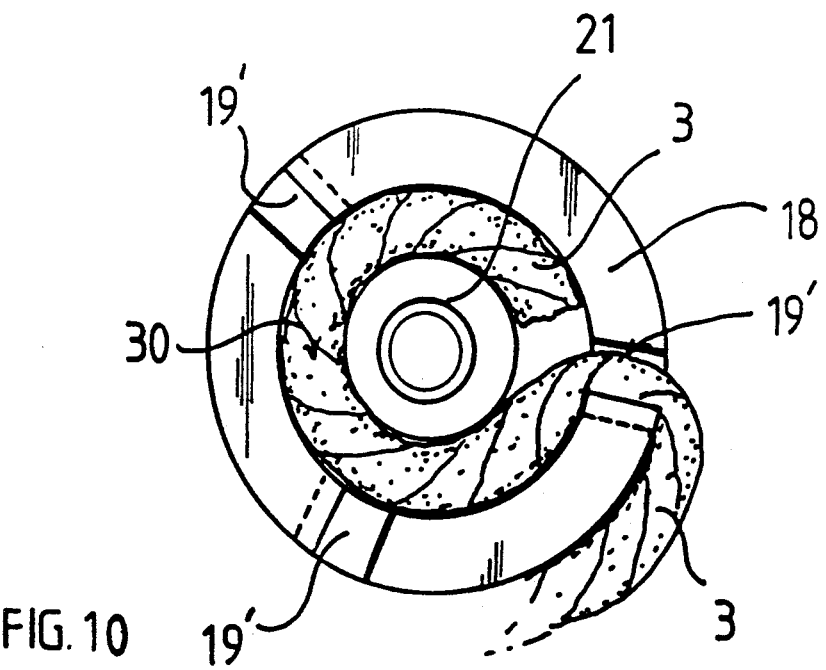
FIG. 10 is a plan view of the further modified end cheek of FIG. 9.

The end cheek of FIGS. 9 and 10 is similar to that of FIGS. 4 to 7, similar parts having corresponding reference numerals. The four holes of the side wall 20 are replaced by three rope-receiving holes 19' which open through the flange 18 and are inclined in the direction of winding of the rope 3. The pairs of webs 22 are omitted but the dimensions of the annular recess 30 formed between the wall 20 and boss 21 are adjusted to receive the tail end of the rope 3 as a close fit. The end of the rope is inserted through any convenient hole 19' and is then inserted, back-wound, into the recess 30. The rope ends are thus held just as securely as in the embodiment of FIGS. 4 to 7, but the rope ends are easier to secure and the end cheeks are cheaper to manufacture.

We claim:
1. A scratching post comprising:
 a backing plate;
 a pair of spaced support walls projecting from said backing plate;
 an elongate carrier member removably mounted between said support walls;
 a cheek member secured to each end of said carrier member; and
 a flexible element helically close-wound about said carrier member between said cheek members, said flexible element having opposite ends which are releasably secured to said cheek members.
2. A scratching post as claimed in claim 1 wherein:
 each of said cheek members comprises a generally cylindrical side wall containing an aperture, and a generally cylindrical inner wall, said two walls together defining an annular recess, and the respective end of said flexible element being inserted through said aperture and retained in said recess.
3. A scratching post as claimed in claim 2 wherein:
 said side wall of each cheek member contains a plurality of apertures at circumferentially spaced positions.
4. A scratching post as claimed in claim 2 wherein:
 said aperture opens through an edge of said side wall and is inclined in the direction in which said flexible element is wound about said carrier.
5. A scratching post as claimed in claim 1 wherein:
 said carrier member is mounted between said support walls for rotation about the length of said carrier member, and the scratching post comprises locking means for securing said carrier member in a plurality of different rotational positions.
6. A scratching post as claimed in claim 5 wherein:
 said locking means comprises a screw-threaded pin which is inserted through one of said support walls, and one of said cheek members includes a cooperatively screw-threaded aperture for receiving said screw-threaded pin, whereby said carrier member can be drawn into engagement with the said support wall.
7. A scratching post as claimed in claim 1 wherein:
 said flexible element comprises a length of rope.

* * * * *